United States Patent

[11] 3,568,176

[72] Inventor Carroll W. Schouest
New Orleans, La.
(69 Derbes Drive,
Gretnce, La. 70053)

[21] Appl. No. 701,030
[22] Filed Jan. 6, 1968
[45] Patented Mar. 2, 1971

[54] SIGNAL MONITORING APPARATUS
2 Claims, 4 Drawing Figs.

[52] U.S. Cl. .......... 340/251, 179/1, 317/141, 340/228, 340/248
[51] Int. Cl. .......... G08b 21/00
[50] Field of Search .......... 340/248, 251, 22.85, 253; 179/1 (Inquired); 317/148.5 (TD)

[56] References Cited

UNITED STATES PATENTS 1,394,642 10/1921 Quass .......... 340/248

*Primary Examiner*—Donald J. Yusko
*Assistant Examiner*—Daniel Myer
*Attorney*—Calvin J. Laiche

ABSTRACT: The present invention pertains to apparatus for monitoring the time interval of an uninterrupted number of pulses of a light source, preferably that emanating from the line light of a conventional telephone set. More particularly, an electrical device for monitoring the time interval of an uninterrupted number of flashes of a telephone line light whereby an operator will be reminded after a predetermined time interval that a party has been on "hold" for such time.

The present invention in its preferred embodiment basically comprises photocell means in combination with a series of contacts and relays whereby the time interval of a number of uninterrupted number of flashes of a telephone line light are monitored.

INVENTOR:
CARROLL W. SCHOUEST

BY: Calvin J. Laiche
ATTORNEY

PATENTED MAR 2 1971

3,568,176

INVENTOR:
CARROLL W. SCHOUEST

BY: Calvin J. Laiche
ATTORNEY

SIGNAL MONITORING APPARATUS

BACKGROUND OF THE INVENTION

There are numerous devices on the market today for recording or registering incoming telephone signals. However, all of these devices are concerned with monitoring the subject matter of a particular call and function basically by automatically notifying the caller that the party desired is away from the telephone set and accordingly requests that a message be left, e.g. see U.S. Pat. Nos. 1,915,413; 2,059,298; 2,850,570; and 3,045,067. None of these devices as well as others on the market today are capable of monitoring an incoming call that has been placed on "hold" and after a certain time, the receiver be reminded of this fact. It is naturally very annoying for a caller to be placed on "hold" and allowed to remain there indefinitely without some word from the receiver's operator as to why the call cannot be completed. This situation not only results in considerable lost time to the caller, but additionally it has been proven to be expensive for the party being called due to lost business and promotion of ill will with customers. These and other related problems are readily resolved by way of the present invention.

SUMMARY

The present invention basically comprises means responsive to an incoming signal which means actuates a circuit comprising relay and timer means such that after the time required for a given number of uninterrupted signal pulses, audio and/or visual means, e.g. a buzzer and/or pilot light, are actuated thus indicating to an operator that the signal has been continued to be transmitted for a given predetermined interval of time. The circuit can constitute either an AC or a DC system.

As applied to an AC system, the present circuit comprises a signal receiving means which will pulse the present circuit as a function of the incoming signal. The signal receiving means is wired in parallel with first relay means. As the signal receiving means energizes the relay, the latter in turn operates contact means. These contact means are wired in series with individual relay and timer means which together with the contact means are wired in parallel across the leads of an AC source of power. The relay and timer means wired in series and actuated by the first relay contact means, comprise a first timer means which operates on a time sequence through individual contact means, a second relay means, and a third relay means. The second and third relay means are in turn individually connected to toggle contact means. The second and third relay means are energized by the timed action of the first timer means which operates individual contacts wired in series with each respective relay. At any given moment when the first timer means is energized, either one or the other of the second and third relay means will be energized. The toggle contact means mentioned above is in turn wired in series with a second timer means with audio and visual means which altogether are wired in parallel across the AC source. Within the latter segment of the circuit, the second timer means, the audio means, and the visual means are wired in parallel. The second timer means in turn is operably connected to second timer contact means which is wired in series with the audio and visual means. In this manner, upon energizing the second timer means by virtue of the toggle switch means, the second timer means after a given interval of time will then in turn energize the audio and visual means to thereby notify an operator that a signal has been incoming for a given period of time.

As applied to a DC system, the present circuit comprises signal receiving and pulsing means which pulses timer and relay means which are wired in parallel with each other, but in series with the signal receiving and pulsing means. Within the timer and relay portion of the circuit, the timer is actuated by the relay through contact means wired in series with the signal pulsing means and the timer. Also wired in parallel respectively with the timer and relay means are individual condenser means which serve to maintain these means in an energized condition for brief periods of operation. That is, during each time interval between the energy pulses of the signal receiving and pulsing means. The timer means are in turn operably connected to contact means which are wired in parallel across the DC power source with audio and visual means, the latter being in series within that particular segment of the circuit. As the signal receiving and pulsing means receives energy pulses, it energizes the timer and relay means, these means being energized continuously by virtue of the individual condenser means. After a predetermined time interval, the timer means closes the contacts to the audio and visual means which thereby informs an operator that signals have been incoming uninterrupted for a given period of time.

A preferred embodiment of the present invention is its adaptation to the reception of signals as generated in a telephone circuit when an incoming call has been placed on "-hold" position. The present device can be operated independently of the telephone circuit by utilizing a photocell that in turn actuates a set of contacts, the photocell being actuated by the flashing line lights of the telephone circuit. On the other hand, the present circuit can augment the telephone circuit by the use of a flashing switch wired in the telephone circuit.

By way of the present invention, an incoming call on a conventional telephone set after being placed on "hold" is monitored whereby after a predetermined time interval, the operator is reminded that the party is holding and has not been contacted since being put on "hold." Accordingly, the operator need not rely on memory and thence can inform the party of the situation which dictates his holding. This practice made possible by way of the present invention achieves considerable savings of time to all parties concerned as well as avoids loss of business.

DESCRIPTION OF THE PREFERRED EMBODIMENTS

Figure 1:
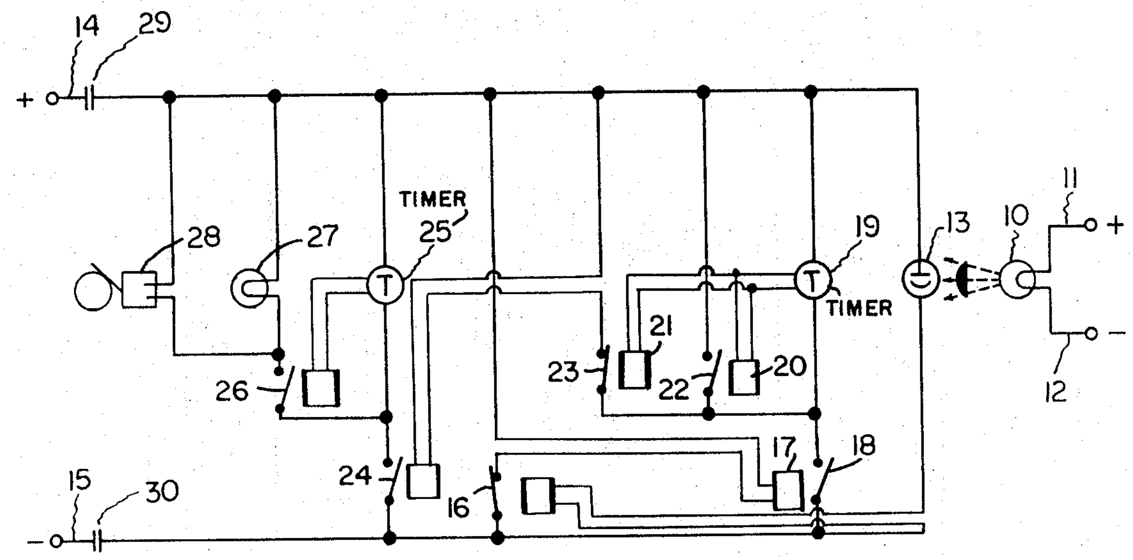
FIG. 1 represents a schematic of the present invention embodied in an AC System or circuit.

Referring to FIG. 1 in the drawings, the incandescent lamp 10 represents line light of a conventional telephone set which is wired in the circuit of the set by virtue of the conduits 11 and 12. When an incoming call is received and the party is placed in a hold position, the lamp 10 will pulse on and off until the receiver is picked back up again at which time it will remain on continuously during the conversation. The present monitor means includes the photocell means 13. The means 13 is connected across the conductors 14 and 15 which represents a power source, e.g., 110 volt 50 cycle AC power. The photocell means 13 is operably connected to the normally closed contacts 16 whereby the first relay means 17 is deenergized upon the photocell means 13 being biased or actuated by the transmission of light from the lamp 10. The first relay 17 is wired across the AC power source in parallel with the photocell 13. The relay 17 is in turn operably connected to the contact means 18 which is in turn connected in series across the AC power source with the timer portion of the circuit. The latter comprises the first timer means 19, second relay means 20, and the third relay means 21. The second and third relay means are wired in series with the normally open contact means 22 and normally closed contact means 23 respectively. At any given moment when the first timer means 19 is energized, either one or the other of the second and third relay means will be energized.

The second and third relay means are operably connected to the toggle contact means 24 whose sequence of operation is thereby timed by virtue of the operation of the first timer means 19. The toggle contact means 24 is in turn wired in series with the signal indicating portion of the circuit which together are wired across the AC power source.

The signal indicating portion of the circuit comprises the second timer means 25 which is operably connected to the normally open contact means 26. The contact means 26 is in turn wired in series across the AC source with the audio and/or visual means. It is preferred to employ both audio and visual means, specifically, the buzzer means 27 and the pilot means 28.

In operation, the circuit is placed in the on position by virtue of a time clock, viz., the contact means 29 and 30, which has been set for the normal or desired business routine of a particular telephone set. As voltage appears to the circuit, the relay 17 is energized by virtue of the normally closed contacts 16. The relay 17 upon energization opens the normally closed contacts 18. Simultaneously, as the relay 17 is energized, so is the third relay means 21 and the first timer means 19. However, by virtue of the contacts 18, the third relay and first timer are immediately deenergized. This brief period of operation of the third relay 21 is sufficient, however, to latch close the normally open contacts 24.

Closing of the contacts 24 thereby actuates the second timer 25 which eventually closes the contacts 26. Closing of the contacts 26 in turn actuates the indicating means 27 and 28. Signals from these means notifies the operator that the system is ready to be placed into normal operation for the day. Thereupon, the operator then depresses a line light button at the operator desk and picks up the telephone headset which thereby causes the line light to come on. When the line light 10 comes on bright, this in turn causes the contact 16 to open due to the action of the photocell 13. The relay 17 in turn then deenergizes whereby the contacts 18 close. This in turn energizes the third relay 21 and the first timer 19. The timer 19 then times open its contacts 23 which deenergizes the third relay 21 while simultaneously times close its contacts 22 which energizes the second relay 20. The second relay 20 in turn latches open the toggle contacts 24 which thereby takes the indicating portion of the circuit off the line. This automatically completes the sequence for a check on the system as initiated by the time clock in preparation for the daily operation of the telephone headset. The system is thus set for continuous operation by the individual flashing of the line light 10 upon the reception of a call that is placed in a hold position.

As a call comes in on a line set for operation in conjunction with the present device, the contacts 16 are kept open by virtue of the action of the photocell 13. With the relay 17 thus deenergized, the contacts 18 close and the timer 19 times the relay 20 close and the relay 21 open. Accordingly, the contacts 24 open and thus deenergize the second timer 25. This opens the circuit to the audio and visual means 27 and 28 by actuation of the contacts 26. This condition remains as long as a conversation ensues between the operator and the caller in which case the line light 13 is kept on.

Upon the operator informing the caller that they are to be placed on hold, the flashing line light 10 then alternately opens and closes the contacts 16 by virtue of the action of the photocell 13. On the first pulse, that is, where the line light 10 is deenergized, or is concomitantly deenergized by virtue of the opening of the contact 16. The contacts 18 thereby close which energizes the third relay 21 and the first timer 19. Before the timer 19 times open, the contacts 18 are opened by virtue of the deenergization of the relay 17 initiated by the line light 10 flashing back to the on position This in turn prevents the first timer 19 from timing the third relay 21 open and the second relay 20 close. However, the contacts 24 by virtue of the energization of the relay 21 has since energized the second timer 25. After the preset time built into the timer 25, it closes whereby the buzzer 27 and the pilot light 28 are energized. This notifies the operator that the line has not been answered since it was put on hold.

If the line is then answered, whether it be by the operator or the party being called, the contacts 16 then open due to the action of the photocell 13 as actuated by the line light 10 which is thus continuously maintained bright. Upon the contacts 16 opening, the relay 17 is deenergized thereby closing the contacts 18 and the relays 21 and 20 respectively are deenergized and energized due to the time action of the first timer 19. This sequence of operation in turn opens the contacts 24 whereby operation of the timer 25 is interrupted which in turn opens the contacts 26. The operator then allows the party to continue to hold which repeats the sequence, or obtains information so that the party that has been holding may be called by the party called at a later time. If a call is answered at any time in the hold period, then the above timing sequence will start over again since the timer 25 returns to a zero position upon its interruption.

Figure 2:
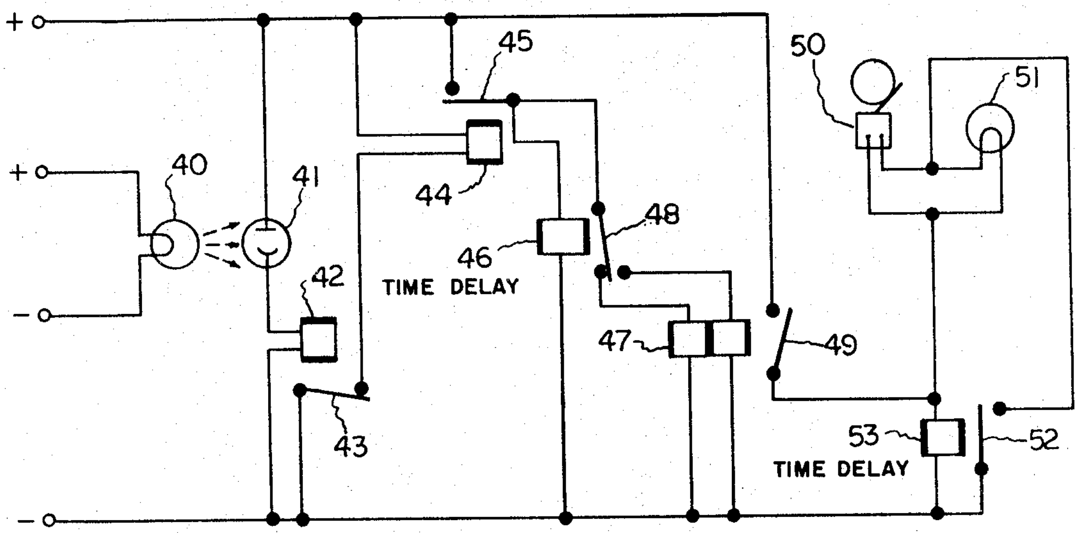
FIG. 2 represents a preferred AC circuit arrangement utilizing specific components.

FIG. 2 represents a preferred embodiment of the present invention showing specific components utilizing an AC circuit. Member 40 represents an incandescent line light of a conventional telephone set which can be installed in any location, that is, on the set itself or in some remote position. The photocell means 41 is placed in close proximity to the light 40. The cell 41 is wired in series with the relay means 42 across the AC power source as in the embodiment of FIG. 1. The relay 42 actuates the normally closed switch or contacts 43. The latter is wired in series with the relay means 44 across the AC power source. The relay 44 actuates the contacts 45 which are wired in series with the relay means 46 and 47, the latter being wired in parallel across the AC power source. The relay means 46 in turn actuates the contacts 48 such that the double acting relay 47, which in turn actuates the toggle switch or contacts 49, is latched in a fixed position depending upon the last received signal. The contacts 49 are wired in series with the indicating portion of the circuit. The latter comprises the bell 50 which is wired in parallel with the lamp 51. The indicating means are in turn wired in series across the AC power source with the contacts 49. The contacts 52 are provided for actuating the indicating means 50 and 51 by virtue of the relay means 53 which is wired in series with the contact means 49 across the power source.

The relay means 42 and 44 are conventional single acting servomechanisms which upon being energized open the contacts 43 and 45 respectively. The relay means 46 and 53 are single acting electropneumatic timer relays which actuates their respective contacts or switches after a predetermined time interval. As conventionally constructed, these servomechanisms include a bellows that is operably connected to the plunger in the solenoid portion of the relay. The bellows includes an air valve whereby the contacts 48 and 52 respectively will not close until after a predetermined time interval. This action thereby allows the transmission of signals to be received for a given period of time before the indicating means are actuated. The mean 47 represent a double acting relay which operates its contacts 49 as a toggle mechanism whereby the contacts 49 are latched in a fixed given position upon actuation of the solenoid portion of the relay 47. The bell or buzzer means 50 as well as the pilot light 51 are conventional indicating means whose specific design and mode of operation are not crucial to the present device.

In operation, the operator upon receiving a telephone call picks up the headset of the telephone set whereby the line light 40 goes on bright continuously. This causes the photocell means 41 to actuate the relay 42 which thereupon opens its contacts 43. This in turn causes the relay 44 to deenergize thereby closing its contacts 45. The relay 46 is thereby energized which initiates the timed opening of its contacts 48. However, as the contacts 45 close, current is instantaneously delivered to the closing solenoid portion of the relay means 47 whereby its contacts 49 are closed. This initiates the timed closing sequence of the timed relay 53. However, before the relay 53 closes its contacts 52, the relay 46 is selected such that its contacts 48 will thereby shift position and energize the opening solenoid of the relay 47. In this manner, the contacts 49 of the latter are thereupon opened thus interrupting the timed closing sequence of the relay 53. The audio and visual means 50 and 51 are never actuated under the condition where the operator has picked up the headset to handle an incoming call.

After an operator has answered the telephone and has placed an incoming call on hold, the line light 40 thereupon immediately begins to flash. As the line light 40 pulses on and off, the interruption of light energy to the photocell means 41 thereupon deenergizes the relay 42 whereby its contacts 43 close. This in turn energizes the relay 44 whereupon its contacts 45 open. This in turn deenergizes the relay 46 whereupon its contacts instantaneously change to their former position as shown in the drawing.

As the next light pulse is received by the cell 41 after but a very brief interruption of operation since the off period of the line light 40 and the hold position is extremely short, usually on the magnitude of a few tenths of a second, the relay 42 is again energized opening its contacts 43. This in turn deenergizes the relay 44 whereby its contacts 45 are closed. Thereupon, the relay 46 is actuated as well as the closing solenoid portion of the relay 47 which is instantaneously operated before the relay 46 begins to time open. The relay 47 in turn closes its contacts 49 whereby the relay 53 begins to time close. As the line light 40 flashes on and off, this mode of operation tends to be interrupted, however, the duration of the off period of the line light 40 is so slight relative to its on duration, that the contacts 48 remain in a closed or near closed position whereby the opening portion of the solenoid 47 is never actuated. This mode of operation allows the contacts 49 to remain in a closed position continuously whereby eventually the solenoid 53 closes its contacts 52 to thereby actuate the indicating means 50 and 51. In effect, the relays 42, 44 and 46 actually pulsate under this condition, that is, when the line light 40 is in the hold position. Upon the operator being so notified by the indicating means that a party being called has failed to accept an incoming call or the operator has been unable to locate the party being called, picking up of the headset thereupon causes the line light 40 to go bright continuously. This in effect causes the above-described sequence of operation to again occur in that the relay 42 is energized and the relay 44 deenergized whereby its contacts 45 close. This energizes the relay 46 which begins to time open after which time the contacts 48 energize the opening solenoid portion of the relay 47 thereby opening its contacts 49. This removes the indicating means 51 from the line.

Figure 3:
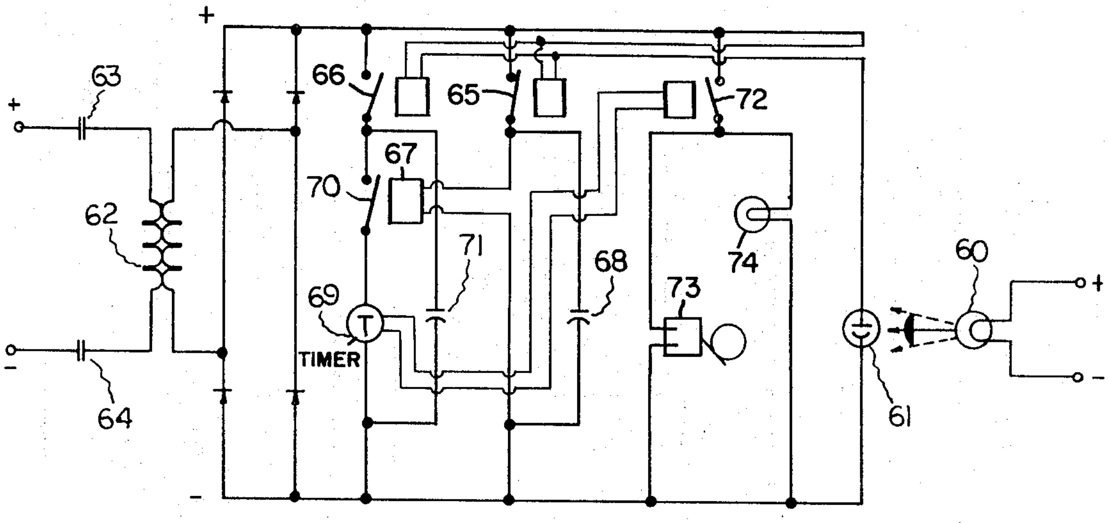
FIG. 3 represents a schematic of the present invention embodied in a DC System or circuit.

Referring to FIG. 3 of the drawings which represents a schematic arrangement of the present invention embodied in a DC circuit, the incandescent bulb 60 represents the line light in a conventional telephone circuit. The photocell means 61 is connected across a DC power source. DC power is provided by virtue of conventional diodes which receive their power from the transformer 62 connected to an AC circuit the entire circuit preferably being actuated by the time clock contacts 63 and 64 similarly as in the case of the AC embodiment of FIG. 1. The photocell 61 is operably connected to the normally closed contact means 65 and the normally open contact means 66. The contact means 65 are wired in series with the relay means 67 across the DC power source. The condenser or capacitor means 68 is provided in shunt across the relay 67. The contact 66 are in turn wired in series with the timer means 69 and the contact means 70 across the DC power source. The condenser means 71 is provided in shunt across the timer means 69 and the contact means 70. The contact means 70 are operably connected to the relay means 67 and function as brought out hereinafter The timer means 69 in turn is operably connected to the contact means 72, the latter being wired in series with the indicating means employed in the present circuit, which are wired in parallel across the DC power source, preferably comprise the pilot light 73 and the buzzer 74.

In operation, when the line light 60 is off, the contacts 66 are open and the contacts 65 closed. By virtue of the latter, the relay 67 is energized. The contact means 72 operably connected to the timer means 69 are also open. As a call comes in and the line light 60 remains continuously bright, then the photocell 61 closes the contacts 66 and concurrently opens the contacts 65. This deenergizes the relay 67 which in turn causes the contacts 70 to open. When the contacts 70 open, the timer 69 is deenergized which thereby prevents the time closing of the contacts 72. In this condition, no power is ever transmitted to the indicating means 73 and 74.

As the operator places a call in the hold position such that the line light 60 then begins to flash, upon the first flash, the contacts 66 will close and simultaneously the contacts 65 will open. The contacts 65 thereby removes the relay 67 from its voltage source, however, the relay 67 does not deenergize for approximately 2 to 3 seconds due to the discharge of the condenser 67 which feeds back into the circuit. This condition is maintained even though the contacts 65 open and close during the flashing light condition whereby the relay 67 will continue to maintain the contact 70 close. As the line light goes on the next bright pulse, the contacts 66 are closed thereby actuating the timer 69. This causes the timer 69 to begin to time close. As the contacts 66 open on the next pulse of the line light 60, even though the timer 69 is removed from its voltage source, it does not immediately deenergize due to the discharge of the condenser 71. The timer 69 is thereby maintained in an energized state for approximately 2 to 3 seconds whereby the contact 72 continues to time close. Thus it can be seen that by virtue of the condensers 68 and 71, the relay means 67 and the timer means 69 respectively are maintained in an energized condition whereby the timer 69 eventually closes the contact 72. The timer 69 is selected to give whatever time close period is desired. Generally, a timer with a closing period of about 45 seconds is suitable. Upon the contact 72 closing, the indicating means 73 and 74 are energized thereby indicating to the operator that the incoming call has been on hold longer than desired. The operator thereupon is notified and upon picking up the headset interrupts the indicating means 73 and 74 by virtue of the circuit behaving under the continuous bright condition of the line light 60 as described above. The party on hold is then advised as to the status of the person for whom he is holding or can either leave word or elect to hold again.

Figure 4:
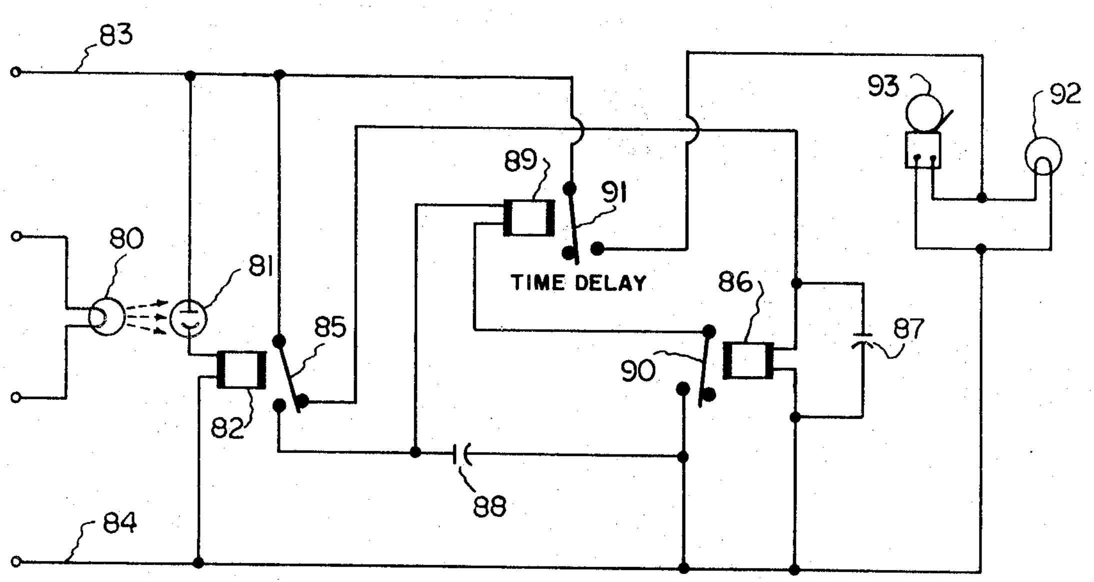
FIG. 4 represents a preferred DC circuit arrangement utilizing specific components.

FIG. 4 depicts a preferred circuit arrangement and components employed in the DC circuit arrangement of FIG. 3. In FIG. 4, 80 represents the incandescent bulb of a telephone headset which upon going bright, transmits signals to the photocell means 81. The photocell means are wired in series with the solenoid coil of the relay 82 which operates the contacts 85. Together, they are wired in series across the DC power source represented by the conductors 83 and 84. The normally closed pole of the contacts 85 is wired to the coil of the relay 86 which is connected in series across the DC power source. The condenser 87 is wired in shunt across the coil 86. The other pole of the switch 85 is wired to the condenser 88 and the coil 89 such that upon actuation of the coil 82, the contacts 85 are switched thereby placing the condenser 88 across the power source. Upon the subsequent reopening of the switch 85, the condenser 88 thereby feeds back into the coil 89. The coil 89 is in turn connected in series with the switch 90 as actuated by the coil 86. Upon actuation of the coil 86, the switch 90 closes thereby placing the coil 89 across the DC power source when the switch 85 has shifted position from that shown in the drawing. The coil 89 is operably connected to the switch 91 which upon closing, actuates the pilot light 92 and buzzer 93 which together in parallel are wired in series across the DC power source.

As an incoming call is received, the line light 80 goes bright. This thereby biases the photocell 81 thereby energizing the coil 82. However, prior to the contact 85 shifting position, the coil 86 was energized together with the capacitor 87. As the contacts 85 shift position, the capacitor 87 feeds back into the coil 86 to thereby keep it energized. In the manner, the contacts 90 are maintained in closed condition so as to connect the coil 89 to the power source upon the switch 85 shifting position. As the coil 82 is energized initially, the contacts 85 change position thereby energizing the capacitor 88. Additionally, the coil 89 is connected across the power source and upon being so energized initiates the timed action of the contacts 91. On the next pulse of the line light 80, that is, when a party has been placed on hold and the light goes off, the switch 85 returns to its former position thereby recharging the capacitor 87. As the light pulses back on, the switch 85 again changes position thereby recharging the capacitor 88. In the meantime, the coil 89 is maintained in an energized state by virtue of the capacitor 88 feeding back into the circuit. In this manner, the switch 91 continues to time close after the interval of time inherent in its construction. Upon the switch 91 closing, the indicating means 92 and 93 are thereby energized indicating to the operator that the party on hold has been holding for longer than desired.

While I have described my invention with particularity as to specific circuit arrangements and components, it will be apparent to one skilled in the art that considerable changes and modifications can be made herein without departing from its true scope and spirit.

I claim:

1. Signal monitoring means for monitoring the line light pulses of a conventional telephone set placed in a "hold" position by an operator, said means comprising:

a. signal sensing means comprising photocell means wired across a power source and being responsive to the line light of a conventional telephone set; said photocell means being further defined as comprising relay means operably connected to said photocell means, said photocell relay means, being further defined as comprising contact means;

b. first timer means actuated by said signal sensing means, said first timer means being further defined as comprising single-pole double-throw relay means which further comprises a first contact means and a second contact means;

c. first relay as means wired in series with said photocell means and actuated by the contacts of said photocell means, said first relay means being further defined as comprising contact means for actuating said first timer means;

d. second timer means actuated by said first timer means, said second timer being further defined as comprising a single-pole single-throw one-coil relay having contact means for actuating indicating means as hereinafter defined;

e. second relay means responsive to said first timer means for actuating said second timer means, said second relay means comprising single-pole contacts single-throw two-coil relay means, said relay coils being individually operated by said first contact and second contact means of said first timer means, said coils with their respective actuating contact means being wired in parallel with said first timer means, all of which together are wired in series with said photocell contact means across the power source; and f. indicating means wired in series with the contact means of said second timer means, the coil of which is wired in parallel with said indicating means, all of which are wired in series with the single-pole contacts of said second relay means whereby said indicating means is responsive to said second timer means for indicating that signals have been received a predetermined period of time by said signal sensing means as a function of the operation of said first timer means.

2. Signal monitoring means for monitoring the line light pulses of a conventional telephone set placed in a "hold" position by an operator, said means comprising:

a. signal sensing means comprising photocell means and single-pole double-throw coil relay means having first and second contact means;

b. timer means actuated by said signal sensing means, said timer means being further defined as comprising single-pole single-throw coil relay means having contact means and capacitor means wired in parallel with the coil of said relay means across a power source through the first contact means of said single-pole double-throw coil relay means;

c. timer actuating means actuated by said signal sensing means for actuating said timer means, said timer actuating means further defined as comprising coil relay means further comprising contact means wired in series with the coil of said single-pole single-throw coil relay means of said timer means which are in turn wired in parallel with the capacitor means of said timer means, and capacitor means wired in parallel across the coil of said timer actuating relay means, both of which are wired across the power source through said second contact means of said single-pole double-throw coil relay means of said signal sensing means; and d. indicating means for indicating that signals have been received a predetermined period of time by said signal sensing means as a function of the operation of said timer means by being wired across the power source in series with the contact means of said single-pole single-throw coil relay means of said timer means.